United States Patent [19]

Hintner

[11] Patent Number: 4,592,598
[45] Date of Patent: Jun. 3, 1986

[54] PULSATING BRAKE ACCELERATOR FOR RAIL VEHICLE AIR BRAKE

[75] Inventor: Josef Hintner, Türkheim, Fed. Rep. of Germany

[73] Assignee: Knorr-Bremse GmbH, Munich, Fed. Rep. of Germany

[21] Appl. No.: 755,752

[22] Filed: Jul. 17, 1985

Related U.S. Application Data

[62] Division of Ser. No. 492,318, Mar. 6, 1983, Pat. No. 4,552,411.

[30] Foreign Application Priority Data

Aug. 27, 1982 [DE] Fed. Rep. of Germany ....... 3232047
Mar. 25, 1983 [DE] Fed. Rep. of Germany ....... 3211037

[51] Int. Cl.$^4$ ............................................. B60T 15/30
[52] U.S. Cl. .......................................... 303/37; 303/82; 303/69
[58] Field of Search ............. 303/36, 37, 38, 68, 303/69, 70, 81, 82, 83

[56] References Cited

U.S. PATENT DOCUMENTS

| | | | |
|---|---|---|---|
| 3,707,314 | 12/1972 | Paginton | 303/36 |
| 3,716,276 | 2/1973 | Wilson et al. | 303/82 |
| 4,070,068 | 1/1978 | Wickham | 303/82 |
| 4,103,977 | 8/1978 | Wickham | 303/82 |
| 4,108,501 | 8/1978 | Hintner | 303/84 |
| 4,139,239 | 2/1978 | Stauble et al. | 303/82 |
| 4,157,849 | 6/1979 | Wickham | 303/82 |
| 4,206,949 | 6/1980 | Rathband et al. | 303/82 |
| 4,226,482 | 10/1980 | Stauble et al. | 303/82 |

Primary Examiner—Duane A. Reger
Assistant Examiner—Alvin Oberley
Attorney, Agent, or Firm—Pollock, Vande Sande & Priddy

[57] ABSTRACT

A pulsating brake accelerating device for an indirectly operating air brake for rail vehicles has a pulsator (12), which is attached to the brake pipe (BP) via a jet (23). The pulsator (12) forms a mixed pressure from two pressures. One of the pressures is formed by the pressure of the brake pipe (BP) via a jet (23) and the other pressure is formed by pressure from a control chamber (QAC) via another jet. At every braking level the pulsator (12) drains mixed pressure pulses off into the atmosphere, while at the same time the brake pipe pressure and the control chamber pressure is lowered via the mixed pressure pulsator (12). The mixed pressure can consist of two valves (14, 15). The control element (4) of the brake accelerator unit can be the emergency brake piston, which monitors several valves, one of which is the pulsator-excitation valve (8).

12 Claims, 4 Drawing Figures

PULSATING BRAKE ACCELERATOR FOR RAIL VEHICLE AIR BRAKE

This is a division of application Ser. No. 492,318, filed May 6, 1983, now U.S. Pat. No. 4,552,411.

The invention relates to a pulsating brake accelerator device for an indirectly operating air brake for rail vehicles. In particular the invention relates to a brake accelerator that consists of a pulsator by means of which pulsating compressed air can be drained from the brake pipe to the atmosphere while the pulsator is controlled by a sensor. The sensor may constitute a valve unit with the pulsator. The invention, however, also involves a brake accelerator in which the sensor may be integrated in the emergency brake unit of a brake control valve and which constitutes an accelerator/emergency brake unit with the emergency brake unit.

PRIOR ART

Figure 1:
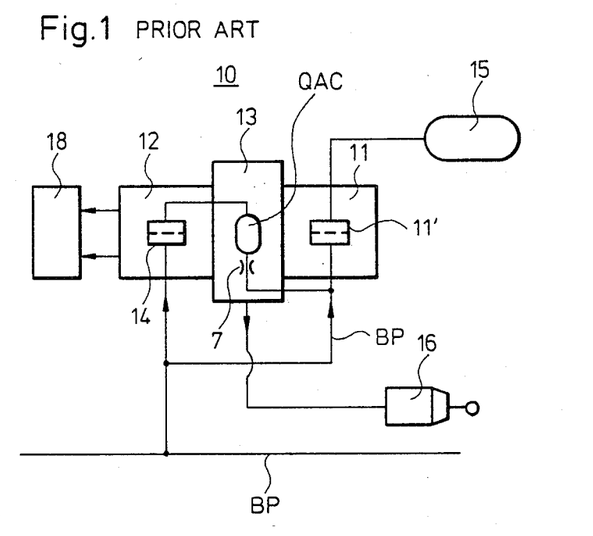

The prior art on which the invention is based is portrayed in FIG. 1.

In FIG. 1 a brake control valve for a direct-release air brake for rail vehicles is designated with the number 10. The brake control valve 10 consists of a service brake portion 11 and an emergency brake portion 12, which are connected to each other pneumatically by a channel connecting plate 13. The service brake portion 11 and the emergency brake portion 12 are connected to the brake pipe BP. The service brake portion 11 is connected with an auxiliary air reservoir 15 and contains a pressure equalizer 11', in which pressure from the auxiliary reservoir 15 is equalized with the reduced BP pressure in the brake pipe BP depending on the brake level that was selected, in order to create a pressure in the brake cylinder 16 corresponding to the reduction in the brake pipe pressure. The emergency brake portion 12 contains an emergency brake piston 14, which equalizes the BP pressure from the brake pipe with the QA pressure of a control chamber QAC, which is connected to the BP line via a filling jet 17.

When the service brake is applied the pressure is reduced by a specific value per unit of time corresponding to the brake level that has been selected, without exceeding thereby a fixed limit value. Corresponding to the reduction in pressure brought about in the brake pipe BP the brake cylinder 16 is impacted by a corresponding pressure from the auxiliary air reservoir 15 in a service brake application. Thus while the service brake portion monitors the pressure in the brake cylinder 16 in a service brake application, the emergency brake portion 12 checks in every service brake application whether the selected limit value for a maximum drop in the brake pipe pressure has been exceeded. If this limit value is exceeded in a service brake application, the emergency brake portion 12 initiates a rapid braking.

During a service brake application the emergency brake piston 14 monitors a QA bleeder jet, through which pressure equalization between the BP pressure and the QA pressure is established in each case. If the limit value per time unit is exceeded during a drop in pressure in the brake pipe BP, the QA bleeder jet is not quickly enough in a position to reduce the QA pressure to the level of the BP pressure. Because of this an emergency braking is intiated by the emergency brake piston 14 in the known way.

In a train with 150 cars (about 2.3 kilometers long), for example, there is the problem that the brake signal emitted by the locomotive is weakened by flow losses in the pipelines and reaches the end of the train with a delay. This leads to longer brake cylinder filling times and thereby to longer braking times. In order to combat such a flattening out of the pressure gradient in the brake pipe in the area of the end of longer trains and ensure that the pressure impacts simultaneously on all brake cylinders, even at the end of the train, the brake control valve can, as is known, be outfitted with a brake accelerator. For this purpose during a service brake application air is discharged from the brake pipe to the atmosphere at each brake control valve corresponding to the degree of braking. According to U.S. Pat. No. 3,707,314 such a function is monitored by the service brake device only for the first braking level.

More recently the brake control valve has been outfitted with an addtional service brake accelerator that operates not only at the first braking level but at all braking levels. In the U.S. Pat. Nos. 3,716,276, 4,070,068, 4,103,977, 4,139,239, 4,157,849, 4,206,949 and 4,226,482 various brake accelerators have been proposed that operate at every braking level and are all preferentially located in the area of the emergency brake portions, in particular are to be screwed into the emergency brake portions 12.

U.S. Pat. Nos. 3,716,276, 4,103,977, 4,157,849 and 4,206,949 also refer to equipping a service brake accelerator 18 with a pulsator in order to vent air from the BP line to the atmosphere in pulses. In these versions the pulsator is controlled by pressure that is derived from the pressure in the control chamber QAC. U.S. Pat. Nos. 4,070,068, 4,139,239 and 4,226,482 also refer to the control of corresponding pulsators with pressure that is derived from the pressure in the brake pipe BP.

It has been demonstrated that controlling the pulsator with pressure derived from the pressure of the control chamber is especially effective.

CRITICISM OF THE PRIOR ART

The accelerator in accordance with U.S. Pat. No. 3,716,276 has the disadvantage that to excite the pulsator requires the use of QA air that is released by a slide valve that in turn is controlled by the emergency brake piston to maintain or restore the BP/QA pressure balance. Depending on the the service brake level that is set, more or less QA air is released to the atmosphere during a service brake application in order to maintain the BP/QA pressure balance on the emergency brake piston. The pulsator is thus impacted by strongly fluctuating quantities of QA air. For this reason a special back pressure valve is provided through which large quantities of QA air can be vented quickly to the atmosphere without an excessive QA back pressure impacting on the emergency brake piston and switching it to the emergency braking position at the wrong time. The back pressure valve thus constitutes a safety risk, which permits the emergency brake piston to go into the emergency braking position at the wrong time during a functional disturbance if the necessary quantity of QA air cannot be vented to the atmosphere through the back pressure valve in each case. On the other hand the pulsator can be so strongly impacted by QA air that while it is switched into one position it is not assuredly switched back subsequently. The pulsator then would not pulsate. In order to avoid this difficulty a special valve device with an equalization volume connected with the brake pipe air must be available in order to be able to switch the pulsator back to its second setting with certainty by means of brake pipe pressure.

In the accelerator according to U.S. Pat. Nos. 4,157,849, 4,070,068 and 4,206,949 the disadvantages of the accelerator are overcome by the fact that the QA air controlled by emergency brake piston is not used to activate the pulsator. Rather a (BP/QA sensor) is used that is connected parallel with the emergency brake piston and control a valve that admits either BP air or QA air as an activation source for the pulsator. The BP or QA air is switched to the pulsator via a jet.

In this way the quantity of air that is needed to activate the pulsator is specially set. A corresponding jet cannot be connected in the accelerator according to U.S. Pat. No. 3,716,276 between the slide valve and the pulsator, as explained above. In the accelerator according to U.S. Pat. No. 4,206,949 the jet is placed between the BP/QA sensor and the pulsator in such a way that the latter is made to pulse by QA air alone without, as above all according to U.S. Pat. No. 3,716,276 but also according to U.S. Pat. No. 4,070,068, it being necessary for BP air to be specially accumulated in equalization volumes to have brake pipe air impulses available to set the pulsator back into its initial position. In the pulsator according to U.S. Pat. No. 4,206,949 therefore, a single valve seat was sufficient, while the pulsators according to U.S. Pat. Nos. 3,716,276 and 4,070,068 each require two valve seats. U.S. Pat. Nos. 4,157,849 and especially 4,206,949 thus have pulsators that are made to pulse by QA air alone without it being necessary for brake pipe air impulses to be available too for resetting.

In the known accelerators according to U.S. Pat. Nos. 4,147,849, 4,070,068 and 4,206,949, however, it is important that the PB/QA sensors that are connected parallel with the emergency brake pistons be arranged in such a way that they respond at a low threshold of response and that the valve controlled by the sensor for activating the pulsator with QA or BP air be open before the the emergency brake piston opens the QA bleeder valve in order to initiate a rapid braking in an emergency situation. In addition it must be ensured that the valve monitored by the BP/QA sensor goes into its closed position again after the QA bleeder valve.

In other words, the BP/QA sensors attached parallel to the emergency brake piston to monitor the activating sources for the pulsators according to U.S. Pat. Nos. 4,157,849, 4,070,068 and 4,206,949 must therefore have a specified lower threshold of response than the emergency brake piston.

A disadvantage of the known accelerators according to U.S. Pat. Nos. 4,157,849, 4,070,068 and 4,206,949 lies in the fact that the differing thresholds of response cited above must be set far enough apart to ensure that the pulsator controlled by the BP/QA sensor begins to pulsate before the QA bleeder valve controlled by the emergency brake piston is opened to initiate rapid braking.

Through modifications, material fatigue and/or environmental effects, however, the differing thresholds of response for the BP/QA sensor and for the QA bleeder valve can shift, so that there can be overlaps in which then the pulsator that is to be controlled by the sensor goes out of operation.

In the accelerator according to the also known U.S. Pat. No. 4,226,482 it has already been shown that one can do without a BP/QA sensor according to U.S. Pat. Nos. 4,157,849, 4,070,068 and 4,206,949 if the emergency brake piston monitors not only a QA bleeder valve for maintaining the BP/QA pressure balance during a service brake application and a BP rapid discharge valve for releasing a rapid brake application in an emergency situation but in addition a valve for activating the pulsator. Such a solution is recommended above all when BP air drawn from the brake pipe via the valve is used for activating the pulsator and when according to U.S. Pat. No. 4,226,482 and U.S. Pat. No. 3,716,276 the bleeder valve has the form of a slide valve. In this regard it is necessary that the slide valve be fashioned in such a way that when there is a difference in the BP/QA pressure the emergency brake piston first opens or closes the valve controlled by the emergency brake piston for activating the pulsator and only then the slide valve.

Such a solution can no longer be achieved, however, if QA air is supposed to be switched from the QAC chamber to the pulsator by the valve controlled by the emergency brake piston and in addition the QA bleeder valve is no longer fashioned as a slide valve but as in accordance with U.S. Pat. Nos. 4,157,848, 4,070,068 and 4,206,949 is fashioned as a seat valve.

In this regard it should be noted that recently there have been increasing efforts to replace the usual slide valve technology for the QA bleeder valve with a valve seat technology that has various advantages over the slide valve technology.

In the known pulsators that are used there is also the problem that they begin to function when there are relatively small drops in the BP pressure per time unit that are caused simply by pressure losses in the brake pipe and not related to a service brake application. In other words, with the known pulsators one cannot ensure with simple means that they only pulsate when the drop in BP pressure per time unit has exceeded a specified minimum value, that is, when a service brake application has been initiated unambiguously.

TASK OF THE INVENTION

It is the task of the invention to provide a simple, inexpensive and safe brake accelerator of the initially designated type that can be adjusted without difficulties in such a way that it only begins to pulse when the drop in BP pressure in the brake line per time unit has exceeded a specified minimum value. This means that when there are very small drops in pressure per time unit in the brake line that are not caused by a service brake application the pulsator permits appropriate quantities of QA air to flow into the atmosphere from the control chamber QAC to maintain the BP/QA pressure balance without pulsating in the process, that is, drawing BP air from the brake line cyclically.

In addition the brake accelerator is suppoed to be able to be connected with the emergency brake unit of a brake control valve. Also the sensor of the brake accelerator for exciting the pulsator is supposed to be able to be integrated into the emergency brake unit and to form an emergency brake/accelerator-valve unit with the latter. Further the brake accelerator is supposed to be capable of being installed as a separate valve unit if necessary to support the accelerator function of one or more brake control valves parallel to the brake control valve or valves involved.

SOLUTION OF THE INVENTION

The task is solved according to the invention with the characteristics of one or more claims.

Advantageous variations and modifications of the invention result from the combination of the characteristics of one of the claims in combination with the characteristics of at least one additional claim.

The invention will be described more in detail with regard to preferred variations, which are portrayed schematically in the drawing in connection with the prior art (FIG. 1).

Figure 2:
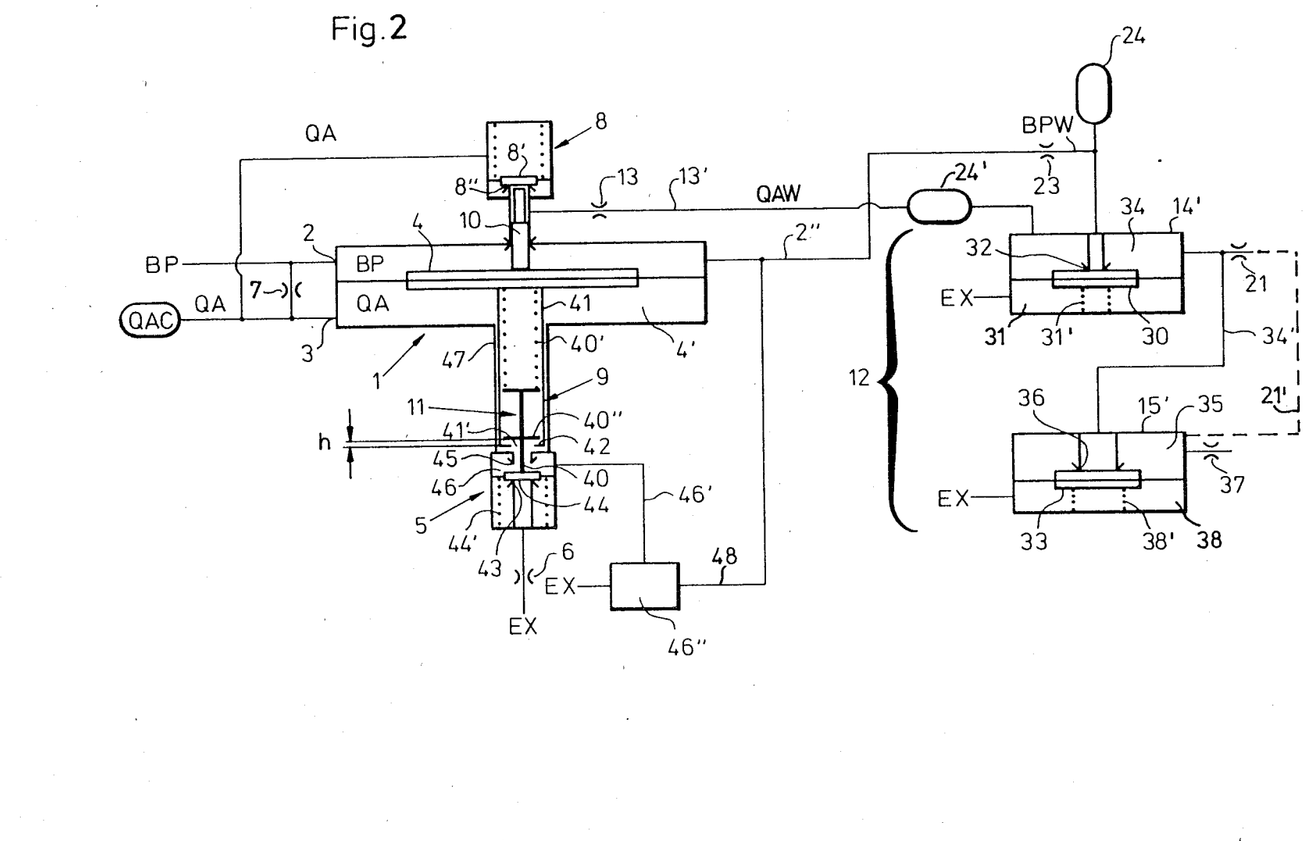
FIG. 2 shows a first model of an emergency brake-/accelerator-valve unit according to the invention in combination with a first pulsator.
Figure 3:
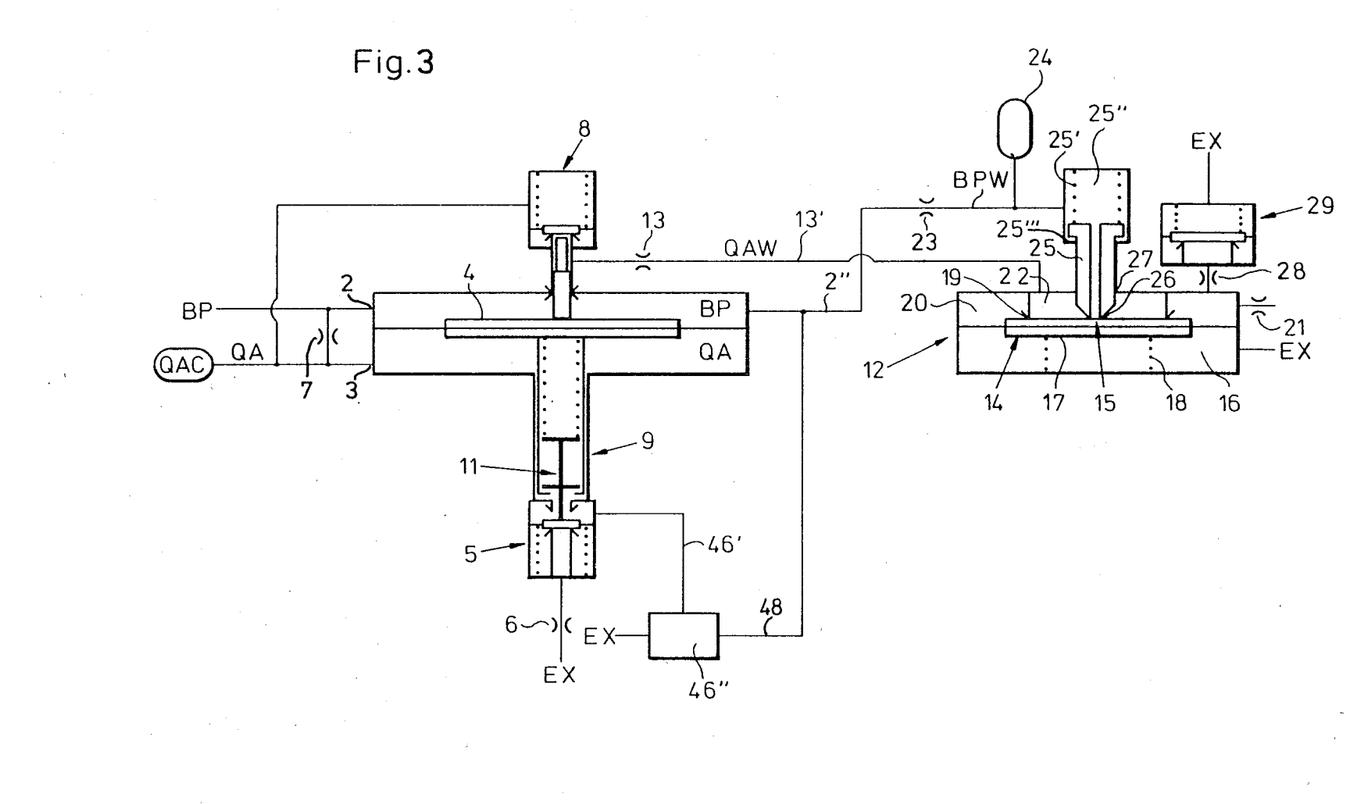
FIG. 3 shows a second variation of a valve unit in accordance with the invention in combination with a second pulsator in accordance with the invention.
Figure 4:
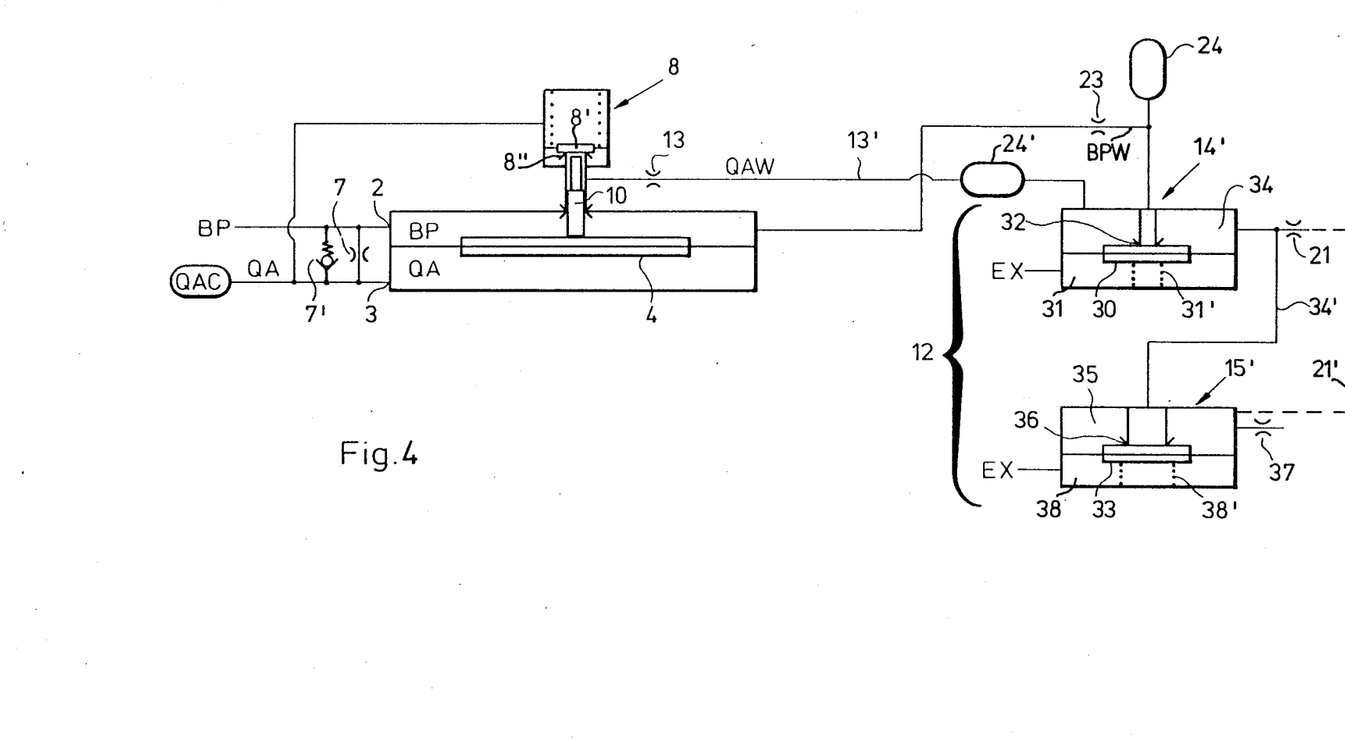
FIG. 4 shows a variation for a separate accelerator valve with the pulsator as in FIG. 2.

In the FIGS. 2 to 4 the same or corresponding parts are given the same numerical designations.

In the FIGS. 2 to 4 a pulsator-exciter valve 8 is integrated as a sensor for exciting a pulsator 12 in accordance with the invention that remains to be described in an emergency brake device that is designated 1, to form an emergency brake/accelerator valve unit in accordance with the invention. The device has a first inlet 2, which is attached to a brake line BP, and a second inlet 3, which is attached to a control chamber QAC. In addition the device 1 contains an emergency brake piston 4, which is impacted on the upper side by BP pressure from the brake line BP and on the other side by QA pressure from the control chamber QAC, which is attached to the brake pipe BP via a filling jet 7.

On the BP pressure side the emergency brake piston 4 controls a tappet 10, which is passed movably and pressure-tight through a valve housing opening and controls the pulsator-exciter valve 8, which is attached to the control chamber or to the QA pressure side of the emergency brake piston via a QA line. The valve 8 consists of a spring-loaded valve plate 8', which in its rest position closes a valve seat 8" between the QA line and a line 13' with a jet 13. If there is a small pressure difference between BP and QA pressure with the QA pressure exceeding the BP pressure, the emergency brake piston 4 in the drawing moves up and opens the pulsator-exciter valve 8 via the valve tappet 10.

On the QA pressure side of the emergency brake piston 4 there is a sleeve 41 in which a tappet 40 is movable. Between the tappet 40 and the base of the sleeve 41 on the piston side there is a spring 40'. One end of the tappet 40 protrudes through a central opening 41'. On the lower end of the sleeve there is a stop 42 to catch the tappet 40. The sleeve 41 on the emergency brake piston 4 is movable in a pipe 47, which is connected with the chamber 4' of the emergency brake device 1 on the QA pressure side. At the lower end of the pipe a QA bleeder valve 5 is held, which consists of a valve plate 44 that can close off a valve seat 43. A spring 44' presses against the valve plate 44 in the opening direction. The elastic force of the spring 44' is weaker than the elastic force of the spring 40'.

If there is BP/QA pressure equality the emergency brake piston 4 assumes the position portrayed in FIG. 2 in which the valve seat plate 44 lies on the valve seat 43. The QA bleeder valve 5 thus is found in its closed position. The chamber of the valve seat 43 is connected with the atmosphere via a QA bleeder jet 6.

At a distance from the lower valve seat 43 a further, upper valve seat 45 is provided. The valve seats 43 and 45 lie coaxially to one another, and the lower end of the tappet 40 reaches through the upper valve seat 45 in order to be supported by the valve plate 44. The two valve seats 43 and 45 are located in a valve chamber 46, which is impacted by QA [air] and to which a line 46' is connected to a BP rapid discharge valve 46", which is only schematically portrayed here and is connected to the brake pipe BP via a line 48.

If there is a difference in the BP and QA pressures because of a BP pressure gradient that exceeds an upper limit, the emergency brake piston 4 switches to its emergency braking position. This means that the tapper 40, which is caught by a stop flange 40" in the sleeve 41, is moved up together with the sleeve 41 by the emergency brake piston 4 when the latter is diverted from the equilibrium position portrayed in FIG. 2 in such a way that the valve plate 44 can close the upper valve seat 45 through the spring 44'. Thereby the connection between the valve chamber 46 and the open valve seat 45 is blocked. On the other hand the valve chamber 46 is connected with the atmosphere via the open valve seat 43 and the jet 6. Correspondingly the line 46 is also only connected to the atmosphere, as a result of which the above mentioned BP rapid discharge valve is switched into its open position to vent the brake line BP via a large cross-section in a known manner.

In the equilibrium position of the emergency brake piston that is portrayed the stop flange 40" on the tappet 40 exhibits a gap h, which corresponds to a dead stroke of the emergency brake piston, from the catch 42 at the end of the sleeve 41 when the BP and QA pressures are equal. This means that the emergency brake piston 4 can be moved upwards in the diagram by the dead stroke h if there is a BP/QA pressure differential in order to switch the pulsator-exciter valve 8 with certainty to the open position before the valve plate 44 rises from the valve seat 43 under pressure from the spring 44' and subsequently closes the valve seat 45.

If the valve seat 43 is open, QA air from the control chamber QAC or from the cylinder 4' on the QA pressure side of the emergency brake piston 4 can escape to the atmosphere via the QA bleeder jet 6. After overcoming the stroke h, the lower end of th tappet 40, which is loaded by the spring 40', thus monitors the width of the gap with which the valve plate 44 of the QA discharge valve can go into the open position, that is, rises from the valve seat 43 before the valve seat 45 closes, in order to initiate the emergency braking.

This opening gap between the valve seat 43 and the valve plate 44 is larger, the greater the BP pressure gradient (drop in pressure per time unit) that is initiated in a service brake application in which the upper limit value above the BP pressure gradients that is selected is not exceeded and thus no emergency braking is initiated.

This means that the opening gap is larger, the more the BP pressure in the brake pipe BP is reduced vis-a-vis the QA pressure in the QAC chamber during a service brake application. Thus QA air is drawn off to the atmosphere via the jet 6 and the QA bleeder valve 43, 44 with a value corresponding to the BP pressure gradient in each case. In addition QA air is drawn off via the valve 8. For small braking intervals corresponding to small changes in pressure per time unit in the brake pipe BP, the valve 8, which has already been opened by the tappet 10, is adequate to draw off the necessary quantity of QA air to the atmosphere via the jet 13 and the line 13' without the valve 43, 44 being open even a small gap.

The sleeve 41 on the emergency brake piston 4 and the spring-loaded tappet 40 in the sleeve thus form a mechanical coupling device 9 between the emergency brake piston 4 and the QA bleeder valve 5. A dead stroke device 11, which is formed by the spring-loaded tappet 40 with its catch flange 40" and the stop 42 in the sleeve 41, is installed in this coupling device.

it is clear that the dead stroke h corresponding to the circumstances in each case can be adjusted so that the thresholds of response of the two valves 5 and 8 can be predetermined precisely.

In FIG. 2 the pulsator that was already mentioned is designated with the number 13 and here is controlled for example by the pulsator-exciter valve 8, which is integrated in the emergency brake device 1. The emergency brake device need not be constructed in the manner described above. In particular it is not necessary for the pulsator-exciter valve 8 to be controlled mechanically by the emergency brake piston via a valve tappet. A corresponding pulsator-exciter valve could also be purely pressure-controlled. The pulsator 12 consists of two valves 14' and 15'. The valve 14' contains a diaphragm-operated piston 30, which on the one hand is impacted by a spring 31 and on the other hand monitors a valve seat 32, which is connected to the BP pressure side chamber of the emergency brake unit via an equalization volume 24 and a jet 23 in a line 2" and thus is impacted by a derived BPW pressure.

The side of the diaphragm-operated piston that is impacted by the spring 31 vents continually to the atmosphere via an opening Ex. The piston chamber 34 on the valve seat side is connected on the one hand to the atmosphere by a jet 21 and on the other hand to the valve seat 36 of the other valve 15' via the line 34'. The valve 15' is monitored by a diaphragm-operated piston 33, which is loaded by a spring 38 on the side lying away from the valve seat 36. In addition the cylinder 34 of the first valve 14' is connected to the pulsator-exciter valve 8 via an equalization volume 24' and the line 13'. The cylinder 34 is thus impacted with a QAW pressure that is derived from the QA pressure of the control chamber QAC via the jet 13. The cylinder on the spring side of the second valve 15' is connected freely to the atmosphere via its opening Ex, while the cylinder 35 on the valve side surrounding the valve seat 36 is connected to the atmosphere via a jet 37.

The exit of the relatively small cross-section jet 21 can also be connected to the cylinder 35, which surrounds the valve seat 36, via a dashed line 21, because the jet 37 has a larger cross-section than the jet 21.

The accelerator in accordance with FIG. 2 operates as follows:

If there is a BP/QA pressure differential on the emergency brake piston the latter opens the valve 8 before the QA bleeder valve opens. The latter opens, as has been said, only if the BP/QA pressure differential is large enough that the piston travel of the emergency brake piston 4 is larger than the dead stroke h that has been set.

If the valve 8 is open QA air passes from the control chamber QAC via the jet 13 into the line 13' to the equalization volume 24' and from there into the cylinder 34. There a QAW pressure backs up, since the jet 21 is selected to be appropriately small. Because of the BP pressure a certain BPW pressure has been established in the equalization volume 24 via the line 2" and the jet 23. This pressure has only an insignificant effect on the diaphragm-operated piston 30 via the relatively small area enclosed by the valve seat 32.

Via the line 34' QAW air also backs up in the inner chamber of the second valve 15', which is enclosed in the valve seat 36. The two valves 14' and 15' are situated in such a way that the first valve 14' switches open at an accumulated QAW pressure of about 1 bar, for example. In the process the relatively higher accumulated BPW pressure from the equalization volume 24 spurts into the valve cavity 34 via the open valve seat 32 and forms a higher mixed pressure of 2.5 bar to 3.0 bar, for example, which reaches the valve seat 36 via the line 34' and opens the second valve 15' with a time delay vis-a-vis the first valve 14'. The mixed pressure is reduced to the atmosphere over the open second valve 15' and the jet 37. At the same time, however, the mixed pressure is reduced over the jet 21 while the first valve 14' is open. The jets 21 and 37 are selected in such a way that despite feeding air through the jet 13 and line 13' as well as line 2" and jet 23 into the cylinders 34 and 35 a drop in pressure occurs, so that the valves 14' and 15' close again; the diaphragm-operated pistons 30 and 33 and the springs 31 and 38 are dimensioned in such a way that the first valve 14' is switched back to the closed position before the second valve 15'. For example the first valve shifts back at about 1 bar and the second valve at about 0.1 bar to 0.5 bar.

It can be appropriate to select the first jet 13 and the second jet 21 approximately the same size.

It is clear that the above dimensional data serve only as examples and are supposed to contribute to clarifying the functioning of the accelerator, without the invention being limited in its conception by these figures.

If the first valve 14' and subsequently the second valve 15' are switched back to their closed positions, QAW pressure in the outside valve chamber 34 of the first valve 14' and in the inner chamber of the second valve 15', which is enclosed by the valve seat 36, can again build up via the jet 13. In addition a certain BPW pressure in the volume 24 builds up again via the jet 23 until the valves 14' and 15' again move to the open position. Through this, however, the two valves 14' and 15' pulsate in the rhythm of the QAW pressure build-up and the QAW/BPW mixed pressure fall-off with a shift in phase with regard to one another. The first valve 14' always goes into the open position first and also goes into the closed position first.

On the basis of the mixed pressure build-up through introducing an especially measured BPW pressure to the accumulated QAW pressure an assured switching of the two valves 14' and 15' is achieved. In the pulsating of the two valves an air mixture is drawn from the brake line BP and the control chamber QAC. Through the jet 21 it is ensured that the valves 14' and 15' only begin to pulsate when the drop in pressure from BP has exceeded a minimum value. In the event of smaller pressure drops of the BP such as may be caused by leaks in the brake pipe a switching of the valves 14' and 15' is avoided. The setting of the minimum pressure at which the valves 14' and 15' begin to pulsate can be found easily in the pulsator according to the invention.

It is clear that the first valve 14' can also be constructed in such a way that it has a diaphragm-operated piston that is impacted on one side by QAW pressure and on the other side is open to the atmosphere and that pulses open the spring-loaded separate seat valve corresponding to the valve 32 via a tappet when the QAW switching pressure is reached. The valve 32 switches air from the BP volume 24 to the inner seat cavity 36 of the second valve 15'.

FIG. 3 shows the emergency brake device 1 corresponding to FIG. 2 in combination with a further pulsator in accordance with the invention. This pulsator too does not have to be combined with the special emergency brake device 1. What was said with respect to the pulsator 12 in FIG. 2 applies also for the pulsator 12 in FIG. 3. The pulsator consists of two valves 14 and 15 and an additional, spring-loaded back pressure valve 29.

The valve 14 is formed by a diaphragm-operated piston 17, which controls a valve seat 19 on one side. A spring 18 in a deaerated cavity 16 presses against the other side of the diaphragm-operated piston 17. A valve pipe 25, which is loaded by a spring 25' in a cavity 25" and is movable only to a limited extent because of a housing catch 25''', protrudes into the valve seat cavity 22, which is enclosed by the valve seat 19, through a sealed opening 27. The end of the valve pipe 25 is shaped as the valve seat 26, the opening of which is also controlled by the diaphragm-operated piston 17. The chamber 25" of the valve 15 is connected to the BP-impacted piston cavity of the emergency brake portion or to the brake pipe BP via a volume 24, the line 2" and a jet 23. The inner valve seat cavity 22, which is enclosed by the valve seat 19, is connected to the pulsator-exciter valve 8 via the line 13' and the jet 13. The back pressure valve 29, which in its open position exposes the chamber 20 to the atmosphere, is connected to the outside chamber 20, which encloses the valve seat 19, via a jet 28. The jet 13 has, for example, a diameter of 0.3 mm, while the jet 23 may have a diameter of 0.8 mm. The jet 21 and the jet 28 have, for example, a diameter of 1.0 to 2.0 mm and 1.5 to 2.5 mm respectively. These figures are intended to provide an understanding of the functioning of the pulsator without restricting the invention.

The accelerator in accordance with FIG. 3 operates as follows: When valve 8 is open QA air passes into the inner valve seat cavity 22 as QAW pressure and accumulates there until the accumulated QAW pressure switches the diaphragm-operated piston 17 to the open position. The volume 24 and the spring cavity 25" for the valve pipe 25 are connected to the brake pipe BP via the jet 23, so that a specified BPW pressure has accumulated in the cavities 24 and 25" before the diaphragm-operated piston opens the valve 14 and, through the mobility of the valve pipe 25 and its housing catch 25''', opens the valve 15 a little bit later. In the open condition of the valve 14 a BPW/QAW mixed pressure, which causes a rapid shift of the diaphragm-operated piston 17 to open the valve 15, is formed in the valve chambers 20 and 22. Thereupon the mixed pressure is reduced via the jet 21 and the jet 28 with the back pressure valve switched back, and so the diaphragm-operated piston 17 goes into its closed position again in order to close the valve seats 19 and 26 again. Thus QAW and BPW pressures can be built up anew in the pulsator 12, and the diaphragm-operated piston 17, which has been switched anew by the accumulated QAW pressure into the open position, makes possible again the formation of QAW/BPW mixed pressure with the reduction of the mixed pressure via the two jets 21 and 28 again. This pulsator 12 thus also pulsates in the rhythm of the pressure accumulation of QAW pressure in the valve seat cavity 22 and the decay of the QAW/BPW mixed pressure via the jets 21 and 28.

FIG. 4 shows a separate accelerator valve according to the invention which can be used optionally in addition to an emergency brake/accelerator valve unit in accordance with FIGS. 2 or 3, as was explained initially. The accelerator valve contains a pressure equalizer, for example a diaphragm-operated piston 4, which is attached on one side to the brake pipe BP via an opening 2 and to a control chamber QAC on the other side via an inlet 3. The diaphragm-operated piston 4 monitors a pulsator-exciter valve 8, corresponding to the valve 8 in FIGS. 2 and 3, via a tappet 10. The valve 8 has a spring-loaded valve plate 8', which can close a valve seat 8'', which in the open position connects a QA line to a pulsator 12 in accordance with the pulsator 12 in FIG. 2 via a jet corresponding to the jet 13 in FIG. 2 or 3.

It is clear that the accelerator valve according to FIG. 4 must be attached to a control chamber QAC. A back pressure valve 7' and parallel to it a filling jet 7 are placed between the brake pipe BP and the control chamber QAC, as is known, for back pressure valve 7' blocking from BP to QA and opening from QA to BP.

It is also clear that the valve 14' of the pulsator 12 in accordance with the invention can also be constructed in such a way that it has a diaphragm-operated piston that is impacted on one side by QA air, is open to the atmosphere on the other side and pushes open a spring-loaded seat valve similar to valve 8 via a tappet when the QA switching pressure is reached. The stationary valve switches the BP volume 24 to the inner cavity of the valve seat of the second valve 15'.

Further it is clear that the pulsator 12 can also be replaced by the pulsator 12 in accordance with the invention in FIG. 3.

The accelerator in accordance with the invention in FIG. 4 in combination with one of the pulsators in accordance with the invention in FIG. 2 or 3 can, however, also be screwed onto an ordinary emergency brake unit that has not been fitted with an accelerator as a valve component in order to form thereby an emergency brake/accelerator-valve unit. In addition the accelerator in accordance with the invention can form a separate valve unit, which can be installed parallel to the emergency brake/accelerator-valve units in addition if desired, as was already mentioned.

The valve unit in accordance with the invention in FIG. 2 or 3 in which the pulsator-exciter valve 8 in each case is combined with the emergency brake unit of a brake control valve that is not further portrayed to make an accelerator/emergency brake-valve unit monitors three valve device according to the invention:

The first valve device is the pulsator-exciter valve 8, the second valve device 5 is installed in the connection between the control chamber QAC and the bleeder jet 6 to the atmosphere and the third valve device 44, 45 connects the line 46, which is connected with the rapid brake valve 46'', via the open second valve device 5 and the bleeder jet 6 to the atmosphere and at the same time closes the connection between the control chamber QAC and the valve member 46.

When there are small drops in pressure per time unit in the brake pipe BP that do not exceed a lower limit and that above all are attributable only to losses of pressure in the brake pipe BP but are not caused by a service brake application, only the pulsator-exciter valve 8 is turned on by the piston 4 to equalize the somewhat higher pressure in the control chamber QAC with the only relatively slowly falling pressure in the brake pipe BP without—thanks to the dead stroke h—the valve 5 opening too. Because of this, air from the control chamber QAC passes through the open valve 8 and the jet 13 to the pulsator 12, where the control chamber air flows quietly to the atmosphere, without the pulsator beginning to pulsate. Thus no air is drawn through the pulsator from the brake pipe BP, which in this situation would also not be desired, since, after all, the assumed slight pressure reduction in the brake line BP is not caused by a service or control brake application.

At relatively high pressure drops per time unit in the brake pipe BP, which exceed the lower limit value and are attributable to the lowest or a relatively low braking level, again only the valve 8 is opened by the piston 4, while the valve 5 remains closed. The air that is now streaming into the pulsator 12 from the control chamber QAC via the open valve 8 causes the pulsator to pulsate, so that QAW/BPW mixed pressure impulses are discharged to the atmosphere with the pulsating frequency of the pulsator.

If, on the other hand, a medium or higher braking level is initiated, the pressure gradient in the brake line BP is so much steeper that the necessary quantity of QA air from the control chamber QAC no longer can be vented to the atmosphere via the open valve 8 and the attached pulsator alone. The piston in such a case opens not only the valve 8 but also the valve 5, through which the control chamber QAC is connected to the atmosphere in addition vai the bleeder jet 6. In this way the control chamber pressure can be adapted quickly to the brake pipe pressure, which is falling at a rate determined by the brake level that is selected in each case, without a rapid braking being initiated. In the process, however, QA air is vented to the atmosphere not only via the bleeder jet 6 but also via the open valve 8 and the pulsating pulsator 12.

If in an emergency situation the pressure drop in the brake pipe BP per time unit is so large that an upper limit value is exceeded, then the piston 4 moves the valve 44, 45 into its closed position, while the valves 8 and 5 remain in the open position. In this way the line 46' to the rapid discharge valve 46" is opened to the atmosphere via the jet 6, upon which the rapid discharge valve is moved into its open position in a known way. Through this the brake pipe BP is connected with the atmosphere via the line BP and a known large cross-section valve seat that is not portrayed. Through this a rapid discharge of the air in the brake line BP takes place in the known manner.

I claim:

1. Pulsating brake accelerator (4, 8, 12) for an indirectly operating air brake for rail vehicles, operating at any braking level of a service brake application (control braking) and having a first inlet opening (2) for brake line signals and a second inlet opening (3) for reference pressure signals, said reference pressure signals originating in a control chamber (QAC) which is connected with a brake pipe (BP) via a filling nozzle (7), said brake accelerator (4, 8, 12) having a control organ (4) that reacts to pressure differences between the pressure signals at said first and second inlet openings (2, 3), a control element (4) controlling a first valve device (8) for the operation of a pulsator (12) which releases repeated air pulses from said brake pipe to atmosphere during every braking level, said first valve device (8) being connected to said control chamber (QAC), via a first nozzle (13), to said pulsator, wherein:
   (a) said pulsator (12) is directly connected to said brake pipe (BP) via a second nozzle (23);
   (b) said pulsator (12) forms a mixed pressure from a first derived pressure (QAW) and a second derived pressure (BPW), said first pressure (QAW) being derived from the pressure in said control chamber (QAC) via said first nozzle (13) and said first valve device (8) and said second pressure being directly derived from the pressure in said brake pipe (BP) via said second nozzle (23); and
   (c) said pulsator (12) consists of first and second valves (14', 15');
   (d) said first valve (14') has a first valve piston (30) for mixed pressure formation which separates a first valve chamber (34) from a second valve chamber (31), said first valve chamber (34) being connected to the sensor (8) via a first volume (24') and said first nozzle (13), said first valve chamber (34) being open to atmosphere via a third nozzle (21), and said second valve chamber (31) being open to atmosphere;
   (e) a first valve seat (32) in said first valve chamber (34) monitored by said first valve piston (30) and connected to said brake pipe (BP) via a second volume (24) and said second nozzle (23), and a first spring (31') in said second valve chamber (31) which loads said first valve piston (30) in the direction of said first valve seat (32);
   (f) said second valve (15') has a second valve piston (33) which separates a third valve chamber (35) from a fourth valve chamber (38), said third valve chamber (35) being linked to atmosphere via a fourth nozzle (37);
   (g) said fourth valve chamber (38) is open to atmosphere, in said third valve chamber (35) there is a second valve seat (36) controlled by said second valve piston (33) and connected to said first valve cavity (34), in said fourth valve cavity (38) there is a second spring (38') which loads said second valve piston (33) in the direction of said second valve seat (36), said third nozzle (21) being selected with a cross-section substantially smaller than that of said fourth nozzle (37); and
   (h) said pulsator releases mixed pressure impulses (BPW/QAW) at every braking level to atmosphere, while at the same time the brake pipe pressure and the control chamber pressure are reduced via said pulsator (12).

2. Acclerator in accordance with claim 1, wherein said first valve chamber (34) is connected to said third valve chamber (35) via said third nozzle (21).

3. Accelerator in accordance with claim 1, wherein said first and third nozzles (13, 21) are approximately the same size and are each smaller than said second and fourth nozzles (23, 37), and said fourth nozzle (37) is larger than said second nozzle (23).

4. Accelerator in accordance with claim 1, wherein the two valves (14', 15') of said pulsator (12) pulsate in phases that are offset to one another in rhythm with the pressure accumulation of the QAW pressure and the falling off of the QAW/BPW mixed pressure, and said first valve (14') switches to its open or closed position before said second valve (15').

5. Accelerator in accordance with claim 1, wherein said accelerator (4, 8, 12) is attachable as a valve component to an emergency brake portion and forms an emergency brake/accelerator-valve unit with the latter.

6. Accelerator in accordance with claim 1, wherein said accelerator (4, 8, 12) forms a separate valve component attached to at least one brake control valve, and a back pressure valve (7') which opens the passage from said control chamber (QAC) to said brake pipe (BP) and closes the passage from said brake pipe (BP) to said control chamber (QAC) is attached parallel to said filling nozzle (7).

7. Accelerator in accordance with claim 1, wherein said control element (4) also functions as an emergency brake piston and forms an accelerator/emergency brake piston-unit which controls a second valve device (5) in a first compressed connecting passage (3, 4', 47) between said control chamber (QAC) and a bleeder nozzle (6) and additionally a third valve device (46") in a second compressed air connecting passage (2, 2", 48) between said brake pipe (BP) and atmosphere, as well as said first valve device (sensor 8).

8. Accelerator according to claim 5, wherein said control element (4) is linked mechanically with said first and second valve device (8, 5) via one coupling device each (10, 9), a dead stroke device (11) being switched into said coupling device (9) between said control element (4) and said second valve device (5), whereby said first valve device (8) moves into open position before said second valve device (5) when there is a pressure drop in said brake pipe, and, when the control chamber pressure is equal to the brake pipe pressure, said second valve device (5) moves into closed position before said first valve device (8).

9. Accelerator according to claim 8, wherein said dead stroke device (11) of said control element (4) consists of a spring-loaded valve tappet (40) which is inserted in a solid sleeve (41) on said control element (4), is longitudinally movable and controls the second valve device (5) by its end which protrudes from said sleeve (41), a stop (42) in said sleeve (41) arresting said tappet (40).

10. Accelerator according to claim 9, wherein said second valve device (5) consists of a valve seat (43) and a valve plate (44) loaded in the open direction of said second valve device (5) by a first spring force, said valve seat (43) being connected to said discharge nozzle (6) and said second spring force (40') loading said valve tappet (40) in the closing direction of said valve plate (44) being stronger than said first spring force (44') loading said valve plate (44).

11. Accelerator according to claim 10, wherein the maximal dead stroke (h) between said stop (42) and said valve tappet (40) occurs when the BP pressure and QA pressure are equal, whereby said valve plate (44) is held in its closed position by said valve tappet (40).

12. Accelerator according to claim 10 or 11, wherein said first valve device (5) has a second valve seat (45), said valve plate (44) being movably arranged in a valve chamber (46) and controlling the closed position of said valve seats (43, 45), said valve chamber (46) being linked with said control chamber (QAC) via said second valve seat (46) and being connected to said third valve device (46").

* * * * *